(12) United States Patent
Allard et al.

(10) Patent No.: US 7,374,364 B2
(45) Date of Patent: May 20, 2008

(54) TRENCH DRAIN FILTER ASSEMBLY

(75) Inventors: Douglas Paul Allard, Santa Rosa, CA (US); Jonathan McDonald, Cloverdale, CA (US)

(73) Assignee: KriSTAR Enterprises, Inc., Murrieta, CA (US)

( * ) Notice: Subject to any disclaimer, the term of this patent is extended or adjusted under 35 U.S.C. 154(b) by 0 days.

(21) Appl. No.: 11/656,015

(22) Filed: Jan. 22, 2007

(65) Prior Publication Data

US 2007/0274784 A1 Nov. 29, 2007

Related U.S. Application Data

(62) Division of application No. 11/249,900, filed on Oct. 12, 2005, now Pat. No. 7,165,913.

(60) Provisional application No. 60/617,885, filed on Oct. 12, 2004, provisional application No. 60/724,442, filed on Oct. 5, 2005.

(51) Int. Cl.
*E02B 11/00* (2006.01)

(52) U.S. Cl. ............... 405/45; 405/43; 210/170.03; 210/323.2; 210/457

(58) Field of Classification Search ........... 405/36–41, 405/43–45; 210/163, 164, 170.03, 323.2, 210/457, 461
See application file for complete search history.

(56) References Cited

U.S. PATENT DOCUMENTS

| | | | | |
|---|---|---|---|---|
| 2,521,833 A | * | 9/1950 | Dahl | 210/458 |
| 2,540,272 A | * | 2/1951 | Malmstrom et al. | 53/409 |
| 3,950,252 A | * | 4/1976 | Jordan et al. | 405/36 |
| 4,400,274 A | * | 8/1983 | Protos | 210/302 |
| 6,177,004 B1 | * | 1/2001 | Bracone, Jr. | 210/170.08 |
| 6,277,280 B1 | * | 8/2001 | Houck | 210/616 |
| 6,383,372 B1 | * | 5/2002 | Houck et al. | 405/43 |

* cited by examiner

*Primary Examiner*—Frederick L Lagman
(74) *Attorney, Agent, or Firm*—Howrey LLP

(57) ABSTRACT

An improved trench drain filter and modular system therefor for intercepting and treating run off water in a trench drain before discharge into a drainage system. The filter elements include a perforated pipe covered with one or more layers of geotextile material, which is, in turn, covered with a permeable fabric membrane. In a preferred embodiment a pouch containing an absorbent agent is disposed within the pipe upstream of the discharge point, and in another embodiment a multi-filter modular unit is provided, the unit including a plurality of filter elements disposed in an enclosure having fluid flow control baffles to direct fluid to and through the filter elements.

4 Claims, 5 Drawing Sheets

TRENCH DRAIN FILTER ASSEMBLY

CROSS REFERENCE TO RELATED APPLICATIONS

This application claims the benefit of U.S. Provisional Application No. 60/617,885, filed Oct. 12, 2004, and entitled "Trench Drain Filter Assembly," and U.S. Provisional Application 60/724,442, filed Oct. 5, 2005, and entitled "Improved Trench Drain Filter Assembly," and is a divisional of U.S. patent application Ser. No. 11/249,900, now U.S. Pat. No. 7,165,913, filed Oct. 12, 2005, and entitled "Trench Drain Filter Assembly." The foregoing applications are hereby incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention generally relates to an apparatus for treating surface water runoff prior to its discharge into a drainage system, and more particularly to a modular filter and filter assembly for use in trench drains.

BACKGROUND INFORMATION AND DISCUSSION OF RELATED ART

Of continuing concern today is untreated run off from streets, highways, parking lots, loading areas and the like, where leaked hydrocarbons, such as gasoline, diesel oils, lubricating oils, rubber and metal particles, and the like, as well as sediment, dirt and debris are accumulated and carried with surface waters into existing drainage systems. These contaminants are either carried by the drainage systems to treatment plants where their introduction increases the load on the plant's purification systems, or they are directly discharged to the environment, that is onto land or into streams, lakes and other bodies of water in an untreated state, such untreated water further stressing the environment.

Trench drains have historically been used to capture runoff from parking lots, gas stations, loading dock areas, and the like. These drains consist of elongate trenches with grates overtop. In areas such as gas stations and interior loading docks which are frequently cleaned by being hosed down, the wash waters carried to the trench drains are collected and discharged into pipes interconnected to a local drainage system, or simply discharged remote from the area being cleaned.

The need to perform a measure of primary treatment of the waste waters has been recognized for some time. Addressing this need, for example is a trench drain insert sold by KriStar Enterprises of Santa Rosa, Calif. A description of these trench drains can currently be found on the company web site at www.Kristar.com. The insert easily and economically converts a trench drain into an apparatus for absorbing petroleum hydrocarbons. The insert consists of an elongate cradle sized to attach to the side walls of the trench drain, and an elongate bag supported therein, which is made from polymeric mesh, and filled with an absorbent material, the product sold under the tradename Fossil Rock™. The absorbent material comprises either an amorphous alumina silicate or RUBBERIZER®, a hydrocarbon polymer based filter medium. This product is expensive to manufacture, however, due to the need to custom size the elongate cradle to the trench drain being fitted, and, due to the requirement it be non corrosive, the cradle is made from stainless steel. The sizing requirement can be particularly problematic where the trench to be fitted is both narrow and shallow, e.g. five inches wide by five to six inches deep, and must accommodate both the cradle, and filter bag, and still receive the cover grating. Furthermore, the FloGard™ (absorbent bag) inserts used with this product are currently provided in two foot sections, the use of such short sections increasing the time required for installation, and maintenance, especially given the extended lengths of some trench drains, which can be as long as 50 feet, or more.

Accordingly, the need exists for an easy to install, inexpensive, and effective apparatus to intercept and capture selected pollutants before they are discharged into runoff systems and released into larger bodies of water, the hydrocycle, or deposited on soils.

The foregoing prior art devices reflect the current state of the art of which the present inventor is aware. Reference to, and discussion of, these patents and/or prior art devices is intended to aid in discharging Applicant's acknowledged duty of candor in disclosing information that may be relevant to the examination of prospective claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention is an improved, low cost, easy to install elongate filter for trench drains which does not require the use of a cradle to support a filter medium. Instead, the filter apparatus of the present invention comprises a hollow, elongate tubular support structure which is connected at its one end to the outlet of the trench drain. The structure is made sufficiently porous such that first, low volume flows entering the trench drain must pass through and within to the interior of the structure before entering the drainage discharge. An overflow bypass is provided such that during times of high water flow, backed up water may pass directly to the is drain discharge, thus assuring that the capacity of the drain is not compromised by the presence of the drain filter.

The hollow support structure is preferably rigid and perforated, or otherwise provided with openings such as slots or holes that prevent the passage of large debris while allowing sediments and smaller debris carried by drain water to pass to the interior of the structure where it undergoes treatment One or more elongate filter pouches or bags are disposed within the hollow interior of the rigid support structure. The filter bag contains an absorbent material, and the bag itself is made of a porous cloth or fabric that facilitates contact of the drain water with the treatment materials contained inside the bag. Contaminants are removed from the drain when the water passes into the support structure and comes into contact with the filter materials.

According to this invention, there is provided a walled elongate core member having a first end, a second end and an interior space, with an outer filter member surrounding the elongate core member, and an absorbent material filling at least a portion of the interior space.

It is therefore an object of the present invention to provide a new and improved trench drain filter apparatus.

It is another object of the present invention to provide a trench drain filter apparatus that is easy and inexpensive to install in existing drain water systems.

A further object or feature of the present invention is a new and improved trench drain filter apparatus that removes selected pollutants from drain water.

An even further object of the present invention is to provide a novel modular trench drain filter apparatus that may be deployed in either linear or side-by-side configurations.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawing wherein.

DETAILED DESCRIPTION OF THE PREFERRED EMBODIMENTS

The trench drain filter apparatus of the present invention comprises an outer, porous, elongate, corrosion resistant support structure which can be formed of any rigid or semi-rigid material, the support structure defining an inner compartment into which is placed a pouch or pouches containing absorbent material. The support structure of the apparatus is preferably tubular, and the entire assembly is preferably provided in modular form, wherein a plurality of filter elements are disposed between two or more flow control baffles in an enclosure configured to direct waste water through the filter elements.

Figure 1:
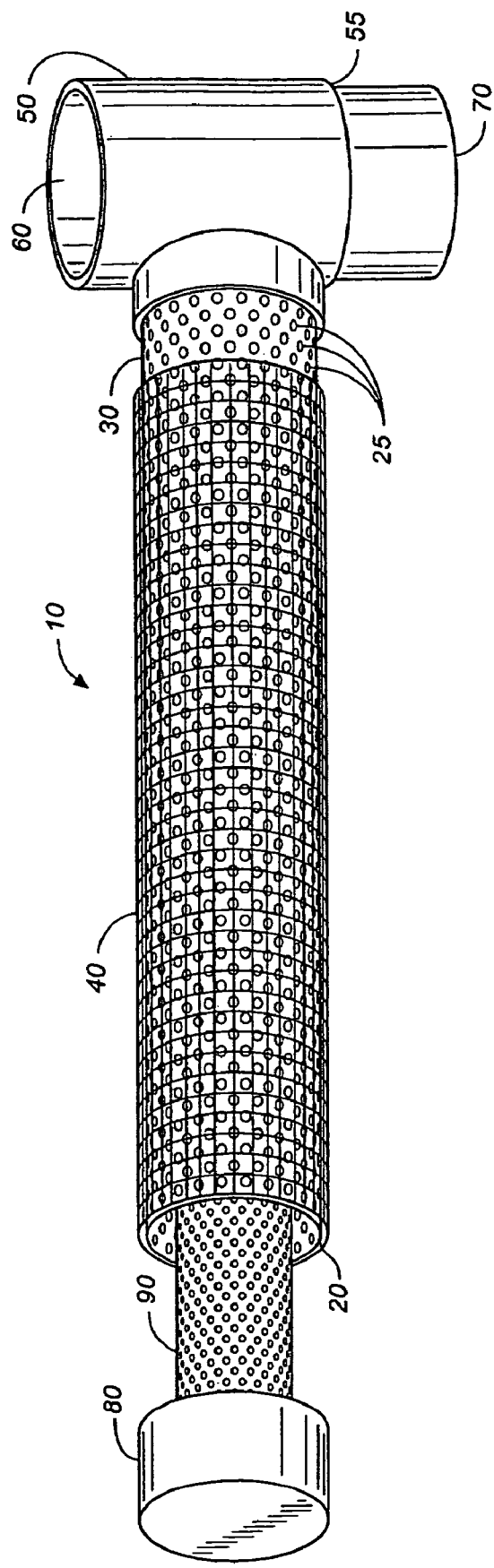
FIG. 1 is a perspective view of a segment of a preferred embodiment of the trench drain filter apparatus of the present invention.

Referring now to FIGS. 1-7, wherein like numbers refer to like elements in the various views, FIG. 1 shows a first preferred embodiment of the inventive trench drain filter of the present invention, generally denominated 10 herein. This view shows the inventive trench drain filter as comprising an elongate, corrosion resistant tube or support structure 20 formed from a perforated pipe or tube 30, such as plastic pipe, which has been perforated or otherwise provided with a plurality of openings 25 to allow water to flow to the shell's interior. The openings in the walls of the tube are provided which are sufficiently numerous and sized to allow for easy fluid ingress. In fact, the tube can be provide with as many openings as possible, compatible with the need for the resultant structure to remain fairly rigid and thus retain its cylindrical form, to define a hollow interior space.

The pipe may be made of high density polyethylene, which is preferred due to its low cost and ready availability. However, any type of suitable pipe material may generally be used, including PVC, HDPE, ABS, etc. The tube may also be formed from an open weave, thermo set resin impregnated fabric, which can be roll formed into a tube and then heat treated to set the resin. The use of such open weave fabrics simplifies the fabrication process to the extent that slots, holes, or other forms of openings need not be provided as is required with plastic piping.

While the exact nature of the tube material is not critical, an essential quality is that it be non-corrosive and provide sufficient structural integrity to support a geotextile fabric filter sleeve 40, with which it is to be substantially, if not entirely, covered.

In another embodiment, the tube structure can be formed from an expanded wire coil, similar to an expanded spring. As with other embodiments, the basic requirement is that the coil provide a basically rigid tubular structure for supporting the filter fabric sleeve, and defining a cavity for receiving an absorbent material containing filter bag.

Referring again now to FIG. 1, perforated tube 30 is covered with a geotextile sleeve 40, which serves as an outer filter member. The sleeve material is a geotextile fabric, either woven or non-woven, and preferably fabricated from polyester or polypropylene fibers. An exemplary woven geotextile fabric is FILTERWEAVE® 4.2, available from TC Mirafi Company of Pendergrass, Ga. The geotextile fabric will generally have a porosity AOS (Apparent Opening Size) factor of not greater than 600 μm, but not less than 180 μm, to permit a flow of water through the porous structure even when the water contains dissolved solids and hydrocarbons, while at the same time filtering out larger sediments, fines and other debris. Suitable geotextile fabrics have a porosity of between 70 gpm/sq ft and 150 gpm/sq ft.

Tube 30 is in fluid communication with an outlet connector 50, which has an integral overflow bypass port 60. As illustrated in FIG. 1, outlet connector 50 can be a T fitting attached to one end of tube 30, but it could also be positioned so as to bisect tube 30 at a location coincident with the trench drain discharge outlet The diameter of the tube is not critical, but it should be small enough to be accommodated by the space defined between the walls of the trench drain, yet large enough to accommodate the rated capacity of the drain. As a practical matter, when the drain filter of this invention is sized for installation as a retrofit to an existing trench drain system, the internal diameter of the selected pipe will be as large as or smaller than the diameter of the drain outlet pipe.

The discharge end 55 of outlet connector 50 is fitted with an outlet extension 70 which is sized to friction fit to the inside diameter of a trench drain outlet. As illustrated, the outlet is positioned to discharge downwardly. However, it will be appreciated that outlet connector 50 can be configured such that extension 70 connects to the trench drain discharge outlet in whatever orientation it is encountered. Thus, outlet extension 70 may be elbowed right or left as needed, or be elbowed behind outlet connector 50 in axial alignment with pipe 30.

Tube 30 at its other end may optionally be fitted with an end cap 80, which can likewise be friction fitted over the end of the pipe, or removably secured with threading. Geotextile sleeve 40 can alternatively be closed at one end to cover the open end of tube 30.

Placed within tube 30 is an elongate pouch or bag 90 which contains an absorbent material. As previously noted, the absorbent material is preferably RUBBERIZER®, a brand name hydrocarbon absorbent, which is a synthetic material such as a modified polyester, sold by Hazardous Materials Response Technologies, Inc., a Zeolite, or other equivalent material. However, other absorbent materials may be selected based upon the location of the drain and the types of contaminates it is most likely to receive.

The pouch itself may be made from any generally inert netted material, strong, yet pliable and having an adequate open are. Exemplary of suitable netting materials include polyester, polyolefin, and nylon. Generally the mesh size openings of the bag may range from 8 to 16 openings per square inch. On the one hand, the netting openings should be as large as possible to allow for maximum contact of runoff with the contents of the bag, but small enough to contain the bag contents.

Pouch 90 may be sized to be the same length as the pipe into which it is to be placed, or may be formed as sections to form a plurality of discrete, connected pouches. Thus, the pouch can be stitched along it length at one or two foot intervals as it is filled with absorbent material. So sectioned, the elongate bag may be easily cut into shorter sections, as needed, to accommodated shortened pipe lengths for custom installation into a trench drain.

In another embodiment, means are provided to secure one end of pouch 90 to the second end of the trench drain filter pipe, in order to prevent the bag from migrating downstream towards the drain and thus bunching up and compacting during periods of high flow. The means, for example, may be provided by securing end of pouch 90 to end cap 80 using any well known securing option such as a threaded hook or a clasp. Alternatively, the bag may be provided with its own end clips or hooks to allow it to be removably secured to either the inside or outside wall of the second end of the tube.

Figure 2:
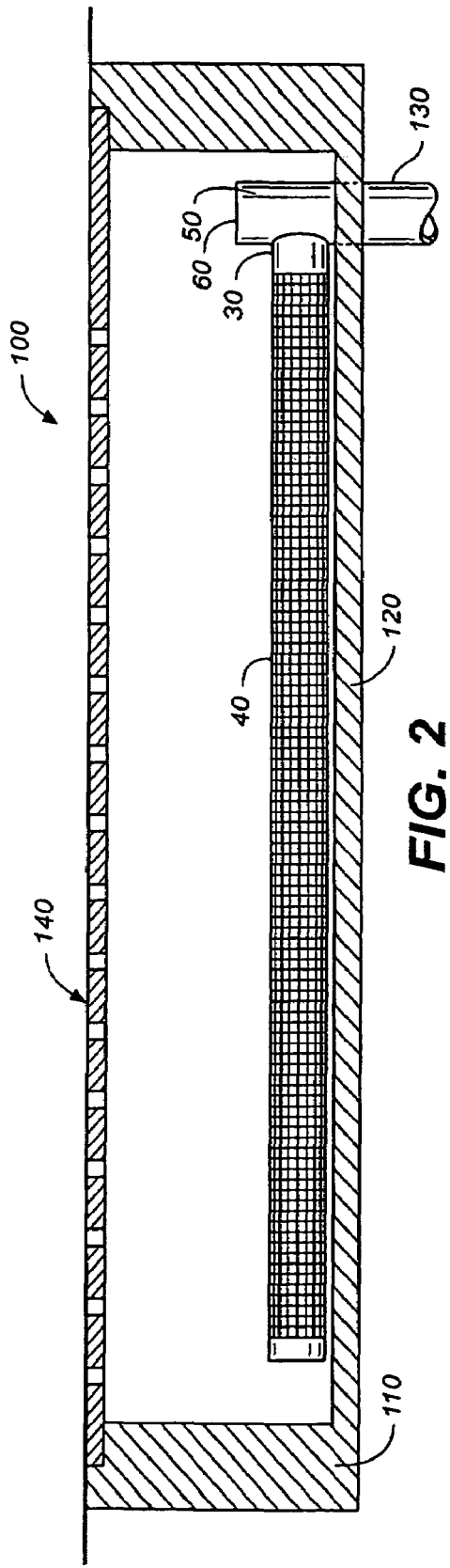
FIG. 2 is a cross-sectional side view in elevation of the trench drain filter apparatus of FIG. 1 shown installed in a trench drain.

FIG. 2 illustrates a typical trench drain into which the elongate drain filter assembly of this invention has been inserted. Trench drain 100 is defined by trench drain side walls (not shown), end walls 110, bottom wall 120, and drain discharge 130. The discharge connector 50 is shown secured to trench drain discharge pipe 130. An extension 70 (not shown in FIG. 2) may be engaged with the interior wall of the discharge drain. A grate 140 is positioned over the open drain cavity and is supported by the side and end walls of the drain.

Figure 3:
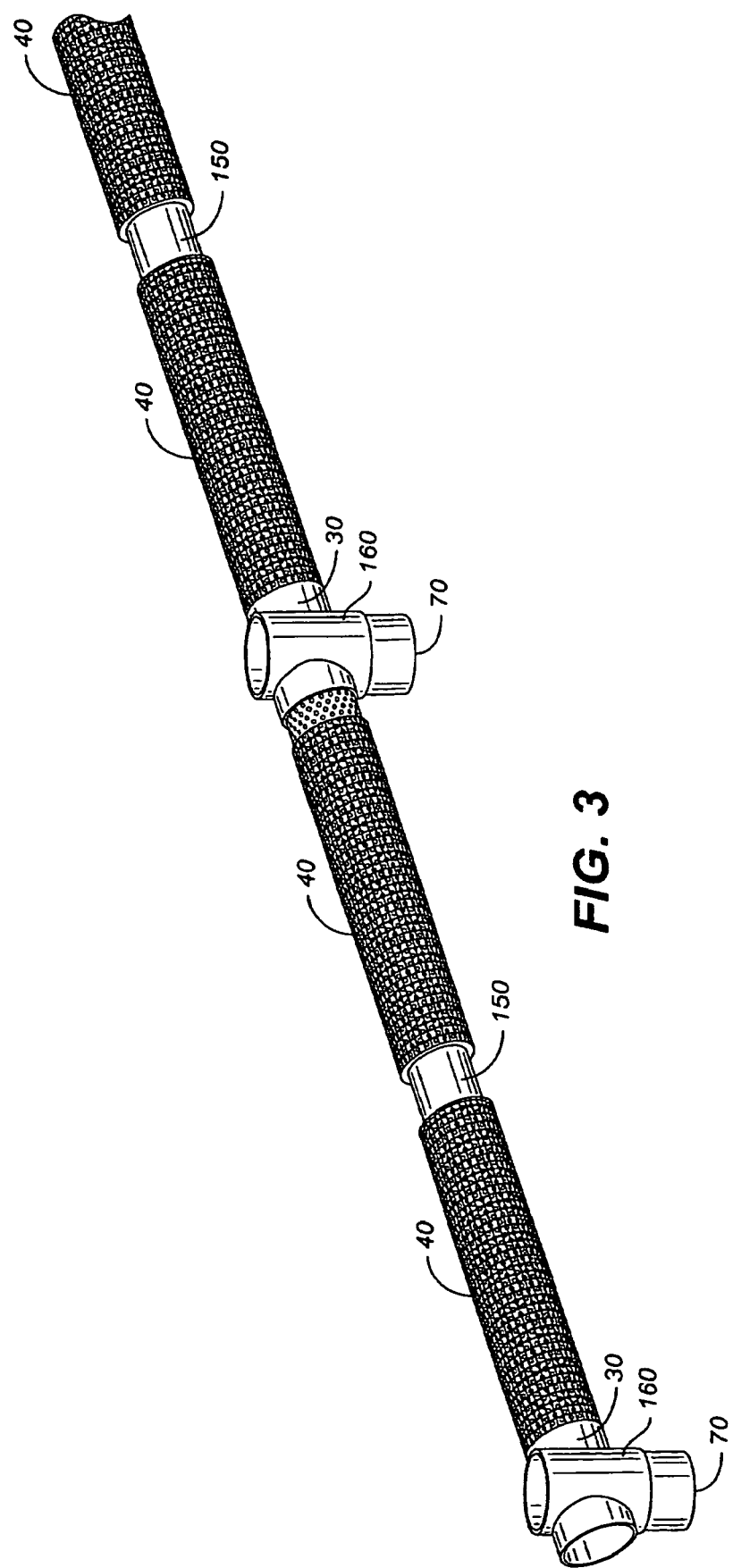
FIG. 3 is a perspective view of the inventive apparatus showing multiple filter segments connected with fittings.

The trench drain filters of this invention can be adapted for retrofitting into any trench drain. As a matter of installation convenience, filter elements may be provided in individual tube sections at lengths from 5 to 10 feet. For longer trench drains, filter sections may be joined as illustrated in FIG. 3, using a series of straight connectors 150, or by connector tees in the form of a connecting bypass outlet 160. For ease of installation, the filter tubes are provided in five foot sections, which can then be connected one section to the other as needed and as well known in the art, with at least one connecting bypass outlet 160 disposed approximately every 10 feet.

Figure 4:
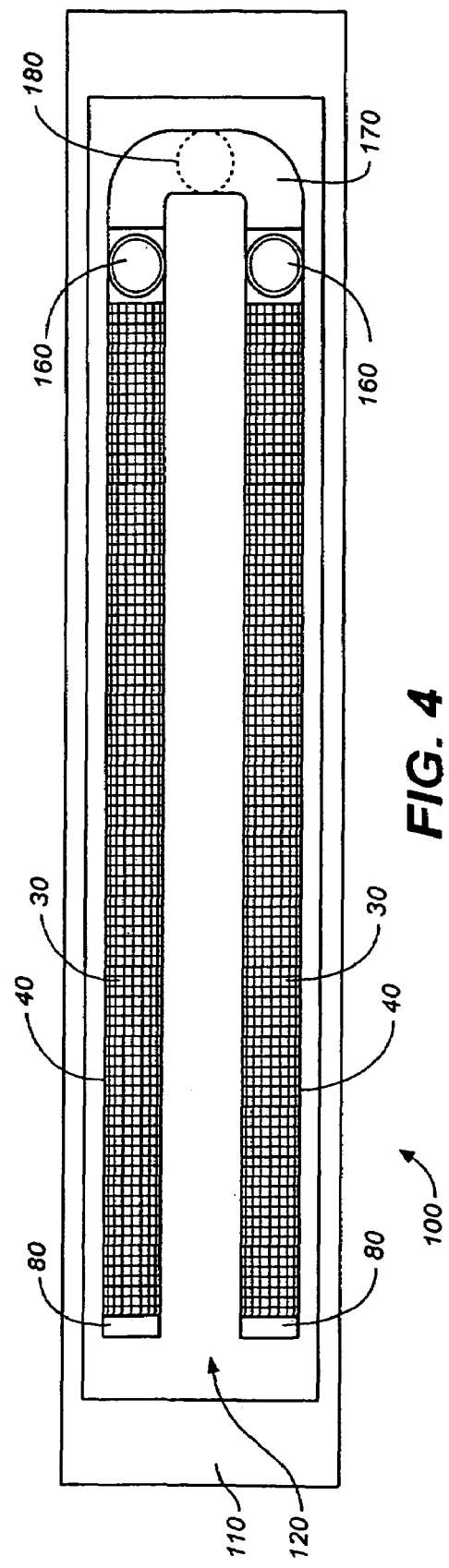
FIG. 4 is a top plan view showing two trench drain filters of the present invention installed side-by-side in a trench drain with its grate removed.

Referring now to FIG. 4, in another embodiment of this invention, adapted for wider trench drains, elongate drain filters may be arranged in side-by-side configuration to increase the surface area available for filtering debris and capturing other pollutants. Each filter assembly segment is provided with a connecting bypass outlet 160 at one end and an end cap 80 at the other end. The bypass outlets are in fluid communication with a double-header outlet manifold 170 having a discharge connector 180. The discharge connector is sized to be friction fit into the trench drain discharge pipe 130.

It will be appreciated that third and fourth drain filter elements may be employed in such a parallel side-by-side configuration, the ultimate number dependent upon size limitations of the trench drain. All filter elements would be similarly connected to the discharge pipe of the trench drain.

Alternatively, in another preferred embodiment, where the encountered trench drain system is very shallow, the support structures may be provided as half round when viewed in cross-section. In the case of plastic tubing, it can be longitudinally cut. In the case of thermoset impregnated fabric, it can be pre-formed over a half round mould. In either case, the resulting structure is covered with a geotextile filter fabric after the absorbent-containing pouches have been placed within the half-round pipe.

It will also be appreciated that the use of trench drains has broad application for vehicle parking lots, aircraft ramps, truck and bus storage yards, corporation yards, subdivision and public streets and highways. The type of contaminants that may be washed into the drains include silt, metal particles, break lining dusts and other debris, petroleum hydrocarbons, oils and greases, and dissolved hydrocarbons. By proper selection of absorbent material, first flush flows can effectively be treated, whereby because of the built in high flow bypass, the system's maximum design flow is not impeded.

Figure 5:
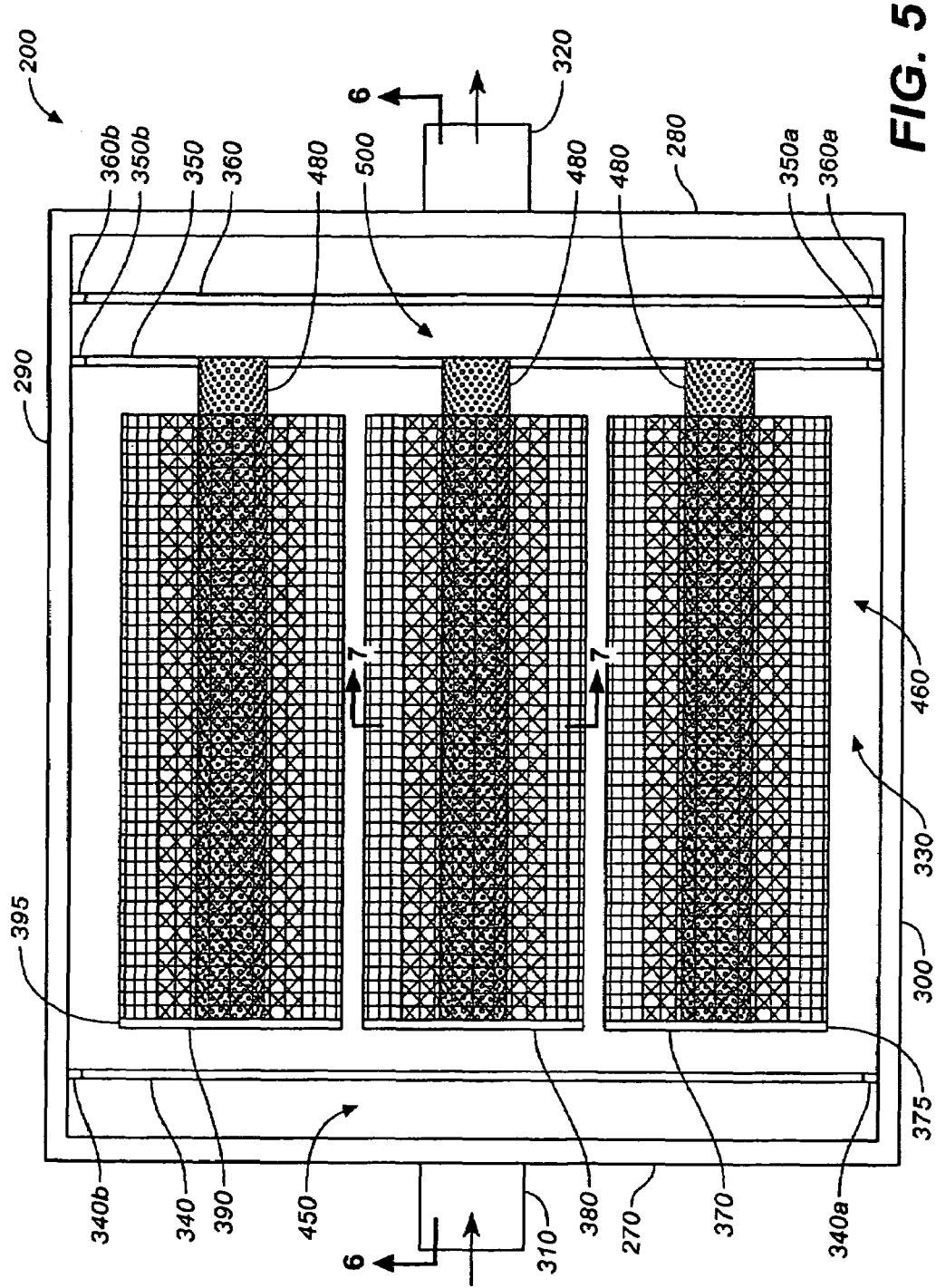
FIG. 5 is a top cross-sectional top plan view taken along section lines 5-5 of FIG. 6, showing a modular trench drain filter apparatus having three side-by-side filter segments disposed between flow control baffles in an enclosure.
Figure 6:
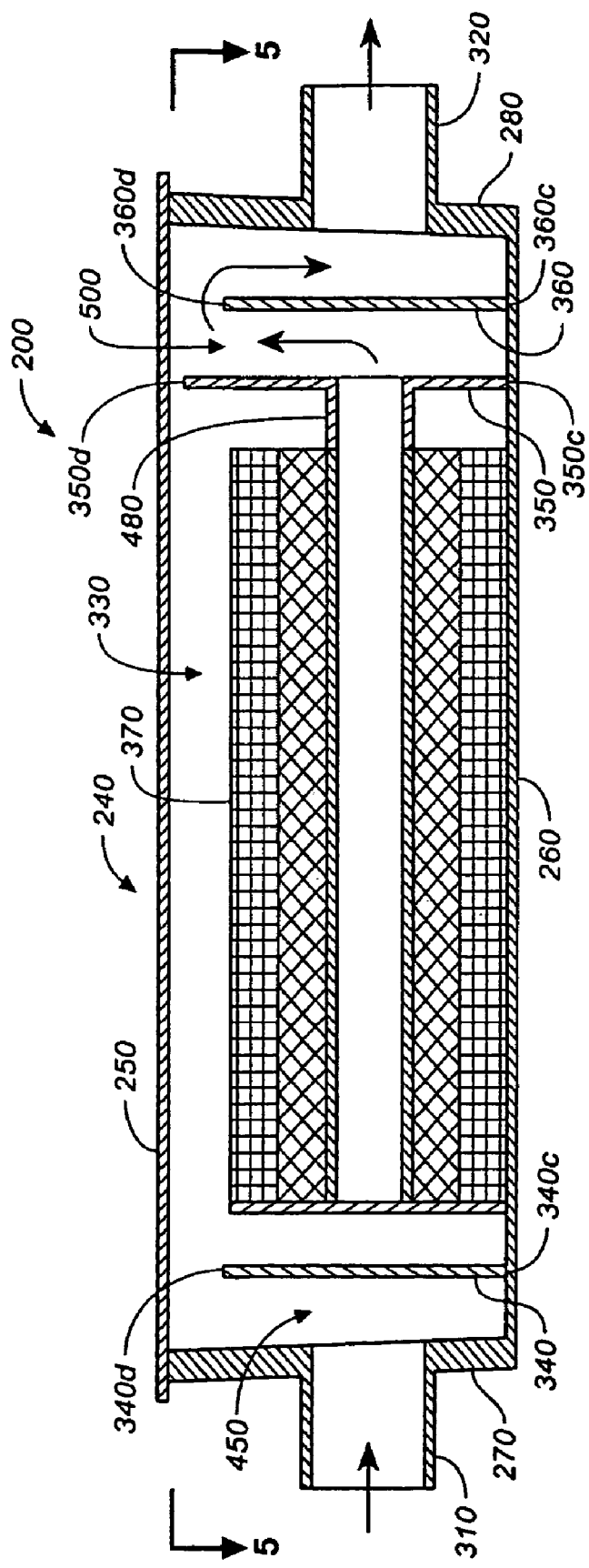
FIG. 6 is a cross-sectional side view in elevation of the modular apparatus of FIG. 5 taken along section lines 6-6 of FIG. 5.
Figure 7:
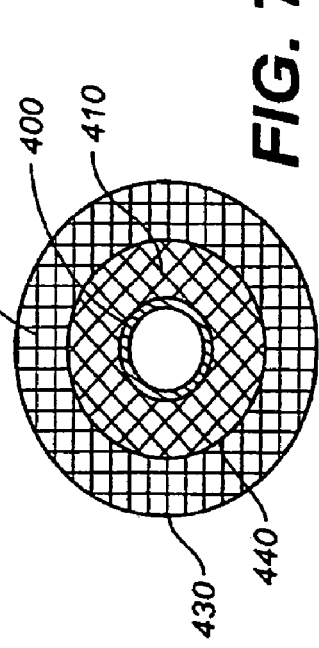
FIG. 7 is an end view of the trench drain filter assembly employed in the modular drain filter system, taken along section lines 7-7 of FIG. 5.

To facilitate rapid placement and replacement of filter elements, a modular unit 200 having a plurality of filter segments 210, 220, 230, can be provided. FIGS. 5-7 show another preferred embodiment of trench drain filter assembly of the present invention, comprising a box-like enclosure or housing member 240 having a top 250, a bottom side 260, an inlet end 270, an outlet end 280, and first and second sides 290, 300. Extending outwardly and rearwardly from the inlet end is a fluid inlet 310, and extending outwardly and forwardly from the outlet end is a fluid outlet 320. The housing may be fabricated from fiberglass, plastic, ABS, PVC, sheet metal, or any of a number of suitable materials. The top is preferably removable, though it is substantially sealed on the sides and ends of the housing member.

The housing defines an interior space 330. The housing may include a plurality of flow control structures disposed within the housing, preferably including first, second, and third partial panels 340, 350, and 360, numbered in ascending order according to proximity to the fluid inlet. Each panel is transversely disposed within the housing, and each includes ends 340a/340b, 350a/350b, and 360a/360b, respectively, that extend and connect to the first and second sides. The panels further have lower edges 340c, 350c, 360c, integral with the bottom side of housing and exposed upper edges 340d, 350d, 360d.

A plurality of filter elements 370, 380, 390, are disposed between the first and second panels. These elements may be of the kind described above, or they may have an alternative filter configuration. Referring now to FIG. 7, preferably, each filter element includes a perforated central support structure, or tube, 400, axially surrounded by an inner mesh filter media 410, which is, in turn, surrounded by a less permeable outer mesh filter media 420. Optionally, but preferably, the outer filter media is covered with a permeable outer wrap 430. Additionally, optionally, but preferably, the inner and outer media are separated by a permeable partition 440. Yet another option is to dispose a third filter media (not shown) within the perforated central tube. This may include mesh filter media of the general kind disposed around the exterior of the support structure, or it may comprise a bag or pouch containing absorbent material, as described above. The filter elements each include a cap 375, 385, 395, at its inlet end, thus forcing drain water entering the interior space 330 between the first and second panels to contact the elements on the surfaces of the mesh material surrounding the support structure.

As will be readily appreciated by reference to FIGS. 6 and 7, the panels function as weirs or flow control baffles. When contaminated water or other fluid is introduced into the inlet pipe 310 it will fill the volume 450 between the inlet end 270 and panel 340 until it reaches a height sufficient to flow over the upper edge 340d of the panel. It will then proceed to fill the more interior space 330 between the first and second panels and surrounding the filter elements, inasmuch as the upper edge 350d of second panel 350 is higher than the upper edge 340d of the first panel 340 and also higher than the uppermost extension 470 of any surface of the filter elements. Thereafter, as fluid is filtered into and through the outer mesh media 420, the inner mesh media 410, and then through the permeable partitions (if provided), it will flow into the perforated central tube 400, and will then be gravity fed through a discharge portion 480 of the perforated central tube which extends through openings in panel 350. Fluid then fills the volume 500 between second and third panels, 350 and 360, until the height of the fluid surpasses the upper edge 360d of third panel 360, which is lower than the upper edge 350d of panel 350, such that it is directed to outlet pipe 320. The housing member may be provided with weep holes (not shown) disposed around one or more sides and/or ends.

Accordingly, in its first and most essential aspect, the modular embodiment of the trench drain filter apparatus of the present invention includes a housing defining an interior space and having an inlet end and an outlet end, a bottom and a top, and first and second sides; a fluid inlet disposed from the inlet end; a fluid outlet disposed from the outlet end; flow control means disposed within the interior space of the housing; and a plurality of filter elements, each having a perforated central support structure having a hollow interior in fluid communication with the fluid outlet and surrounded by at least one layer of mesh filter media, whereby fluid entering the fluid inlet is directed to the filter elements by the flow control means so as to bring the fluid into contact with and flow through the mesh filter media, then into the hollow interior of the filter elements, and thereafter to the fluid outlet.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. For example, it will be appreciated that the foregoing description discloses the use of certain trademarked absorbent materials and geotextile fabrics. The use of any specific absorbent is not a necessary part of this invention, nor is the exact composite of the geotextile material used to form the elongate bag.

The invention claimed is:

1. A trench drain filter apparatus, comprising:
   a housing having an inlet end and an outlet end, a bottom and a top, and first and second sides, said housing defining an interior space;
   a fluid inlet disposed from said inlet end;
   a fluid outlet disposed from said outlet end;
   flow control means disposed within the interior space of said housing; and
   a plurality of filter elements having a perforated central support structure having a hollow interior and surrounded by at least one layer of mesh filter media, said support structure in fluid communication with said fluid outlet;
   whereby fluid entering said fluid inlet is directed to said plurality of said filter elements by said flow control means so as to bring the fluid into contact with and flow through said mesh filter media into the hollow interior of the filter elements and thereafter to be directed to said fluid outlet;

wherein said flow control means comprises at least two spaced apart flow control baffles, and said filter elements are disposed between said flow control baffles.

2. The apparatus of claim 1, wherein said flow control baffles include first and second flow control baffles, said first flow control baffle closer to said fluid inlet than second flow control baffle, and whereby said filter elements are disposed between said first and second flow control baffles.

3. The apparatus of claim 1, wherein each of said first and second flow control baffles includes sides affixed to said sides of said housing, a bottom edge integral with said bottom of said housing, and an upper edge, and wherein said upper edge of said second flow control baffle is higher than said upper edge of said first flow control baffle.

4. A trench drain filter apparatus, comprising:
a housing having an inlet end and an outlet end, a bottom and a top, and first and second
sides, said housing defining an interior space;
a fluid inlet disposed from said inlet end;
a fluid outlet disposed from said outlet end;
flow control means disposed within the interior space of said housing; and
a plurality of filter elements having a perforated central support structure having a hollow interior and surrounded by at least one layer of mesh filter media, said support structure in fluid communication with said fluid outlet;
whereby fluid entering said fluid inlet is directed to said plurality of said filter elements by said flow control means so as to bring the fluid into contact with and flow through said mesh filter media into the hollow interior of the filter elements and thereafter to be directed to said fluid outlet;
wherein said flow control means comprises first, second, and third flow control baffles, numbered in ascending order according to proximity to said fluid inlet, each of said baffles including sides affixed to said sides of said housing, a bottom edge integral with said bottom of said housing, and an upper edge, and wherein said upper edge of said second flow control baffle is higher than said upper edge of said first flow control baffle and said upper edge of said third fluid control baffle.

* * * * *